United States Patent
Bridges (10) Patent No.: US 9,705,728 B2
(45) Date of Patent: Jul. 11, 2017

(54) METHODS, SYSTEMS, AND MEDIA FOR MEDIA TRANSMISSION AND MANAGEMENT

(71) Applicant: Google Inc., Mountain View, CA (US)

(72) Inventor: Matt Bridges, New Providence, NJ (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/834,394

(22) Filed: Mar. 15, 2013

(65) Prior Publication Data

US 2014/0281004 A1    Sep. 18, 2014

(51) Int. Cl.
*H04L 29/06* (2006.01)
*H04N 21/2665* (2011.01)
(Continued)

(52) U.S. Cl.
CPC . *H04L 29/06476* (2013.01); *H04N 21/23418* (2013.01); *H04N 21/2665* (2013.01);
(Continued)

(58) Field of Classification Search
CPC .............. G06F 3/0481; G06K 9/00221; H04N 21/23418; H04N 21/8166; H04N 21/4622; H04N 21/2665; H04L 29/06476
(Continued)

(56) References Cited

U.S. PATENT DOCUMENTS 7,840,980 B2    11/2010  Gutta
8,064,516 B2 *  11/2011  Kojokaro ................. 375/240.03
(Continued)

FOREIGN PATENT DOCUMENTS

| EP | 2388721 | 11/2011 |
|---|---|---|
| WO | WO/2012/014130 | 2/2012 |
| WO | WO/2013/040533 | 3/2013 |

OTHER PUBLICATIONS

International Preliminary Report on Patentability and Written Opinion dated Sep. 24, 2015 in International Patent Application PCT/US2014/024627.
(Continued)

*Primary Examiner* — Emmanuel L Moise
*Assistant Examiner* — Zi Ye
(74) *Attorney, Agent, or Firm* — Byrne Poh LLP (57) ABSTRACT

Methods, systems, and media for media transmission and management are provided. In some implementations, a method for media content management is provided, the method comprising: receiving a portion of a media data stream from a first computing device prior to the first computing device processing the portion of the media data stream; processing the portion of the media data stream to identify an object of interest within the media data stream; determining an entity associated with the object of interest; associating a content item with the object of interest based on the determined entity; generating a first representation of the portion of the media data stream, wherein the first representation is associated with the content item; receiving a second representation of the media data stream from a second computing device; determining whether the second representation matches the first representation; and transmitting the content item associated with the first representation to the second computing device for placement within the media data stream in response to determining that the second representation matches the first representation.

24 Claims, 7 Drawing Sheets

(51) Int. Cl.
| | |
|---|---|
| *H04N 21/234* | (2011.01) |
| *H04N 21/81* | (2011.01) |
| *G06F 15/16* | (2006.01) |
| *H04N 21/44* | (2011.01) |
| *H04N 21/266* | (2011.01) |
| *H04N 21/462* | (2011.01) |
| *H04N 21/83* | (2011.01) |

(52) U.S. Cl.
CPC . *H04N 21/26603* (2013.01); *H04N 21/44008* (2013.01); *H04N 21/4622* (2013.01); *H04N 21/83* (2013.01)

(58) Field of Classification Search
USPC ......... 709/231; 715/202, 719, 219; 382/190; 725/109
See application file for complete search history.

(56) References Cited

U.S. PATENT DOCUMENTS

| | | | |
|---|---|---|---|
| 8,185,543 | B1 | 5/2012 | Choudhry et al. |
| 8,205,223 | B2 | 6/2012 | Pack et al. |
| 8,392,951 | B2 | 3/2013 | Park et al. |
| 8,484,017 | B1 | 7/2013 | Sharifi et al. |
| 8,694,533 | B2 | 4/2014 | Oztaskent et al. |
| 8,929,657 | B2 | 1/2015 | Jung |
| 2002/0147984 | A1 | 10/2002 | Tomsen et al. |
| 2004/0104926 | A1* | 6/2004 | Murray ................. 345/719 |
| 2006/0129908 | A1* | 6/2006 | Markel ................. 715/500.1 |
| 2007/0124756 | A1 | 5/2007 | Covell et al. |
| 2007/0136773 | A1 | 6/2007 | O'Neil et al. |
| 2008/0098432 | A1 | 4/2008 | Hardracker et al. |
| 2008/0226119 | A1 | 9/2008 | Candelore et al. |
| 2008/0229363 | A1 | 9/2008 | Lanfermann et al. |
| 2009/0276805 | A1 | 11/2009 | Andrews et al. |
| 2010/0082585 | A1 | 4/2010 | Barsook et al. |
| 2010/0121973 | A1* | 5/2010 | Lobacheva ................. 709/231 |
| 2010/0287053 | A1 | 11/2010 | Ganong et al. |
| 2011/0078753 | A1* | 3/2011 | Christianson ...... H04N 21/8166 725/109 |
| 2011/0103763 | A1 | 5/2011 | Tse et al. |
| 2011/0125735 | A1 | 5/2011 | Petrou |
| 2011/0179357 | A1* | 7/2011 | Lin .................. G06F 17/3089 715/733 |
| 2011/0243449 | A1* | 10/2011 | Hannuksela ................. 382/190 |
| 2011/0246495 | A1 | 10/2011 | Mallinson |
| 2011/0247042 | A1 | 10/2011 | Mallinson |
| 2011/0282906 | A1 | 11/2011 | Wong |
| 2012/0078889 | A1 | 3/2012 | Chu-Carroll et al. |
| 2012/0096499 | A1 | 4/2012 | Dasher et al. |
| 2012/0117057 | A1 | 5/2012 | Adimatyam et al. |
| 2012/0167144 | A1 | 6/2012 | Avison-Fell |
| 2012/0227074 | A1 | 9/2012 | Hill et al. |
| 2012/0240144 | A1 | 9/2012 | Rose |
| 2012/0266197 | A1 | 10/2012 | Andrews, II et al. |
| 2012/0291072 | A1 | 11/2012 | Maddison et al. |
| 2012/0311623 | A1 | 12/2012 | Davis et al. |
| 2012/0311641 | A1 | 12/2012 | Allard |
| 2013/0036442 | A1 | 2/2013 | Wingert |
| 2013/0047178 | A1 | 2/2013 | Moon et al. |
| 2013/0058522 | A1 | 3/2013 | Raesig et al. |
| 2013/0086105 | A1 | 4/2013 | Hammontree et al. |
| 2013/0104172 | A1 | 4/2013 | Lee et al. |
| 2013/0111514 | A1 | 5/2013 | Slavin et al. |
| 2013/0139209 | A1 | 5/2013 | Urrabazo et al. |
| 2013/0174195 | A1 | 7/2013 | Witenstein-Weaver |
| 2013/0179436 | A1 | 7/2013 | Yun et al. |
| 2014/0253472 | A1 | 9/2014 | Ayoub et al. |
| 2014/0255003 | A1 | 9/2014 | Abramson |
| 2015/0193433 | A1 | 7/2015 | Dykeman et al. |

OTHER PUBLICATIONS

International Search Report and Written Opinion of the International Search Authority dated Jul. 24, 2014 in International Patent Application No. PCT/US2014/024627.
International Preliminary Report on Patentability and Written Opinion dated Jul. 14, 2016 in International Patent Application No. PCT/US2014/072258.
International Preliminary Report on Patentability dated Sep. 24, 2015 in International Patent Application No. PCT/US2014/024255.
International Search Report and Written Opinion of the International Search Authority dated Jul. 28, 2014 in International Patent Application No. PCT/US2014/024255.
International Search Report and Written Opinion of the International Search Authority dated Apr. 17, 2015 in International Patent Application No. PCT/US2014/072258.
Notice of Allowance dated Apr. 17, 2015 in U.S. Appl. No. 13/827,413.
Notice of Allowance dated Jun. 5, 2015 in U.S. Appl. No. 13/826,910.
Notice of Allowance dated Aug. 17, 2015 in U.S. Appl. No. 13/801,843.
Office Action dated Jan. 30, 2015 in U.S. Appl. No. 13/826,910.
Office Action dated Mar. 9, 2016 in U.S. Appl. No. 14/966,955.
Office Action dated Mar. 23, 2015 in U.S. Appl. No. 13/801,843.
Office Action dated Apr. 24, 2014 in U.S. Appl. No. 13/801,843.
Office Action dated May 18, 2016 in U.S. Appl. No. 13/826,910.
Office Action dated Jun. 6, 2016 in U.S. Appl. No. 14/966,955.
Office Action dated Jul. 14, 2016 in U.S. Appl. No. 14/191,034.
Office Action dated Jul. 27, 2016 in U.S. Appl. No. 15/005,470.
Office Action dated Jul. 29, 2014 in U.S. Appl. No. 13/826,910.
Office Action dated Dec. 9, 2014 in U.S. Appl. No. 13/827,413.
Office Action dated Dec. 11, 2015 in U.S. Appl. No. 14/966,955.
U.S. Appl. No. 13/594,693, filed Aug. 24, 2012.
U.S. Appl. No. 13/827,413, filed Mar. 14, 2013.
U.S. Appl. No. 14/191,034, filed Feb. 26, 2014.
U.S. Appl. No. 61/922,218, filed Dec. 31, 2013.
YouTube, "Pharos Demonstration—Audiovisual Tunable Search—Part C", last updated Jan. 16, 2010, pp. 1, available at: https://www.youtube.com/watch?v=ZpxyNi6Ht50.
Office Action dated Oct. 20, 2016 in U.S. Appl. No. 14/191,034.
U.S. Appl. No. 13/826,910, filed Mar. 14, 2013.

\* cited by examiner

METHODS, SYSTEMS, AND MEDIA FOR MEDIA TRANSMISSION AND MANAGEMENT

TECHNICAL FIELD

The disclosed subject matter relates to methods, systems, and media for media transmission and management. More particularly, the disclosed subject matter relates to managing the transmission of a media data stream and analyzing images within the media data stream for dynamic insertion and/or modification of a content item.

BACKGROUND

There is an overwhelming volume of content that is available to the average consumer. For example, a viewer can select from television programming that is delivered linearly from a multichannel video programming distributor, video-on-demand content that is provided by a multichannel video programming distributor, personal media content that is acquired by the consumer, recorded content that is stored on a digital video recorder or any other suitable storage device, and/or on-demand content that is provided from over-the-top providers.

Moreover, while watching media content, such as a television program, the viewer is often interested in information in something that has appeared within the television program, such as a product in a commercial or the name of an actor. The viewer, however, typically turns to conducting a search using an Internet-based search engine on another device.

SUMMARY

In accordance with various implementations of the disclosed subject matter, methods, systems, and media for media transmission and management are provided.

In accordance with some implementations of the disclosed subject matter, a system for media content management is provided. The system comprising a hardware processor that is configured to: receive a portion of a media data stream from a first computing device prior to the first computing device processing the portion of the media data stream; process the portion of the media data stream to identify an object of interest within the media data stream; determine an entity associated with the object of interest; associate a content item with the object of interest based on the determined entity; generate a first representation of the portion of the media data stream, wherein the first representation is associated with the content item; receive a second representation of the media data stream from a second computing device; determine whether the second representation matches the first representation; and transmit the content item associated with the first representation to the second computing device for placement within the media data stream in response to determining that the second representation matches the first representation.

In accordance with some implementations of the disclosed subject matter, a method for media content management is provided, the method comprising: receiving, using a hardware processor, a portion of a media data stream from a first computing device prior to the first computing device processing the portion of the media data stream; processing, using the hardware processor, the portion of the media data stream to identify an object of interest within the media data stream; determining, using the hardware processor, an entity associated with the object of interest; associating, using the hardware processor, a content item with the object of interest based on the determined entity; generating, using the hardware processor, a first representation of the portion of the media data stream, wherein the first representation is associated with the content item; receiving, using the hardware processor, a second representation of the media data stream from a second computing device; determining, using the hardware processor, whether the second representation matches the first representation; and transmitting, using the hardware processor, the content item associated with the first representation to the second computing device for placement within the media data stream in response to determining that the second representation matches the first representation.

In accordance with some implementations of the disclosed subject matter, a non-transitory computer-readable medium containing computer executable instructions that, when executed by a processor, cause the processor to perform a method for media content management is provided. The method comprising: receiving a portion of a media data stream from a first computing device prior to the first computing device processing the portion of the media data stream; processing the portion of the media data stream to identify an object of interest within the media data stream; determining an entity associated with the object of interest; associating a content item with the object of interest based on the determined entity; generating a first representation of the portion of the media data stream, wherein the first representation is associated with the content item; receiving a second representation of the media data stream from a second computing device; determining whether the second representation matches the first representation; and transmitting the content item associated with the first representation to the second computing device for placement within the media data stream in response to determining that the second representation matches the first representation.

In accordance with some implementations of the disclosed subject matter, a system for media content management is provided, the system comprising: means for receiving a portion of a media data stream from a first computing device prior to the first computing device processing the portion of the media data stream; means for processing the portion of the media data stream to identify an object of interest within the media data stream; means for determining an entity associated with the object of interest; means for associating a content item with the object of interest based on the determined entity; means for generating a first representation of the portion of the media data stream, wherein the first representation is associated with the content item; means for receiving a second representation of the media data stream from a second computing device; means for determining whether the second representation matches the first representation; and means for transmitting the content item associated with the first representation to the second computing device for placement within the media data stream in response to determining that the second representation matches the first representation.

In some implementations, the system further comprises means for transmitting an instruction to delay the processing of the media data stream on the first computing device.

In some implementations, the system further comprises means for receiving an indication from a plurality of computing devices to allow portions of the media data stream to be transmitted prior to processing the portions of the media data stream, wherein the plurality of computing devices are divided into a first set of computing devices that includes the first computing device and a second set of computing devices that includes the second computing device.

In some implementations, the system further comprises: means for detecting a face within the portion of the media data stream using a facial recognition technique; and means for determining the entity associated with the detected face.

In some implementations, the system further comprises: means for identifying a text portion within the portion of the media data stream using an optical character recognition technique; means for determining whether the identified text portion meets one or more criterion; means for determining the content item associated with the identified text portion in response to the text portion meeting the one or more criterion; and means for transmitting the content item to the second device, wherein the content item causes the second device to navigate to a destination corresponding to the identified text portion.

In some implementations, the system further comprises: means for extracting the object of interest from the portion of the media data stream using an object recognition technique; and means for identifying a product associated with the object of interest, wherein the content item includes information relating to the identified product.

In some implementations, the system further comprises: means for extracting an audio sample from the portion of the media data stream; means for identifying a keyword in the audio sample using an audio recognition technique; and means for determining a product associated with the identified keyword, wherein the content item includes information relating to the determined product.

In some implementations, the first representation and the second representation include a smaller amount of media data than the received portion of the media data stream.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms (which include methods, systems, and media) for media transmission and management are provided.

Generally speaking, the mechanisms can analyze media content from a media data stream, identify one or more content items that are associated with the analyzed media content, and present the content items to a user of a computing device, where the content items can be presented within the media data stream. For example, when the media data stream contains a nature documentary, the mechanisms can modify the media data stream to include content items that describe the different animal species as they are shown in the documentary. In another example, when the media data stream contains a commercial or any other suitable advertisement, the mechanisms can modify the media data stream and particular locations within the advertisements to include related information (e.g., an updated telephone number, a website link, etc.).

In some implementations, a media data stream that is received at a computing device can be transmitted to a server prior to processing the media data stream on that computing device. The media data stream can include, for example, live media data that includes live television programming and commercials. It should be noted that, prior to receiving a portion of the media data stream from a computing device, the mechanisms can receive an indication from one or more computing device that provides an authorization to transmit the portion of the media data stream prior to processing the portion of the media data stream on that computing device.

It should also be noted that the media data stream can be received in any suitable manner. For example, the mechanisms can receive a full sequence of frames of a portion of a media data stream from a computing device. In another example, the mechanisms can receive a single frame or a video fingerprint of a portion of a media data stream from a computing device. In a more particular implementation, the mechanisms can assign a first set of computing devices (e.g., one computing device or a few computing devices for redundancy) to transmit a full sequence of frames of the portion of the media data stream prior to processing that portion of the media data stream. In addition, the mechanisms can assign a second set of computing device (e.g., those computing devices not selected for the first set of computing device) to transmit at least one frame of the media data stream or a video fingerprint of a portion of the media data stream. This can, for example, conserve network bandwidth and/or processing times. This can also allow the second set of computing devices to transmit a smaller amount of media data than the first set of computing devices.

In response to receiving a portion of the media data stream from a computing device (e.g., frames of live television program that are not pre-analyzed or stored in a database), the mechanisms can analyze the portion of the media data stream to determine whether the portion of the media data stream includes an object of interest. The mechanisms can detect an object of interest using one or more of: an object recognition technique to identify objects, landmarks, places, etc. that are shown in the portion of the media data stream, a facial recognition technique to identify faces of actors, actresses, and/or characters that appear in the portion of the media data stream, an optical character recognition technique to identify text portions within video content in the media data stream, such as a telephone number, a website address, a business name, a product name, etc., and/or an optical character recognition technique to identify text portions within closed captioning data that is provided as a part of the media data stream. Upon performing this analysis, the object of interest can be associated with a content item. For example, a selectable website link can be associated with an identified text portion that includes a website address or a business name.

Upon receiving a video fingerprint (e.g., a digital representation that extracts features from a portion of the media data stream and can be used to identify the same or similar portions of media data) from another computing device, the mechanisms can compare the video fingerprint with a database of known video fingerprints. For example, the portion of the media data stream mentioned above can be used to generate a video fingerprint that is associated in the database with an object of interest and/or a content item. The video fingerprints can then be compared to determine a similarity score, where a match is determined when the similarity score is greater than a particular threshold value. It should be noted that, in some implementations, the video fingerprint can be generated by the server in response to receiving at least a portion of the media data stream from the computing device. It should also be noted that, in some implementations, the video fingerprint can be associated with any suitable information. For example, upon receiving consent to use client device information or user information, some video fingerprints can be grouped together.

In response to detecting a match with the video fingerprint, the mechanisms can retrieve the content item associated with the video fingerprint in the database. Alternatively, in some implementations, the video fingerprint can be associated with a media content item, such as a television program. In turn, the media content item can be associated with multiple content items that can be selectively retrieved for presenting to the user within the media content stream.

The content item and/or information relating to placement of the content item (e.g., placement within a particular portion of the media data stream, within a particular region, at a particular time, superimposed over particular content, etc.) can then be transmitted to the computing device for rendering and/or presenting on the computing device.

These mechanisms can be used in a variety of applications. For example, when the media data stream includes a game show, these mechanisms can be used to insert answers to questions presented on the game show within the media content. That is, the mechanisms are not required to analyze a piece of text as it is displayed on or after it is displayed on a computing device and then conduct a search for the answer. In another example, when the media data stream includes a commercial, these mechanisms can be used to dynamically update, replace, and/or insert related information into the commercial. In yet another example, these mechanisms can configure various computing devices for transmitting different representations of the media data stream.

Figure 1:
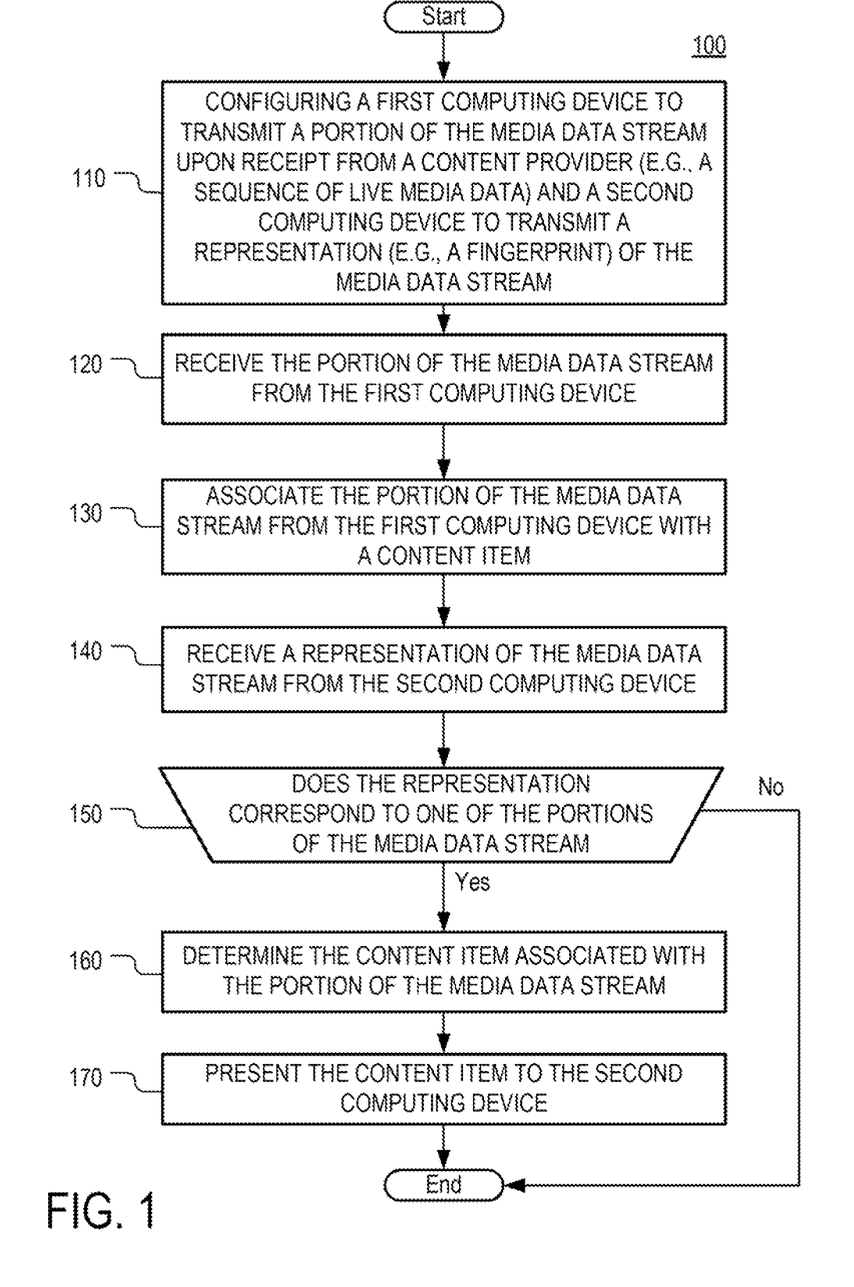
FIG. 1 shows an example of a process for receiving portions of a media data stream from multiple computing devices and presenting related information along with the media content in accordance with some implementations of the disclosed subject matter.

Turning to FIG. 1, an illustrative example of a process 100 for presenting related content items to a computing device is shown in accordance with some implementations of the disclosed subject matter. It should be noted that the computing device can be a television, a smart television, a mobile telephone, a smartphone, a tablet computing device, a wearable computing device, a gaming device, a set-top box, a digital media receiver, etc.

At 110, a first computing device can be configured to transmit a portion of a media data stream upon receipt from a content provider and a second computing device can be configured to transmit a representation of the media data stream, such as a fingerprint. For example, each of the first and second computing devices can begin by loading a client application on the respective computing device, where the client application requests that the user provide authorization to transmit portion of a media data stream and/or representations of the media data stream to a content management server.

As part of the authorization, the client application can also detect device information corresponding to the computing device (e.g., type of computing device, type of hardware that is part of the computing device, applications executing on the computing device, network bandwidth or network characteristics, processing power, service provider information, location information, etc.). In some implementations, additional information can be transmitted to the content management server, such as client device information, user profile information, location information, user preferences, timing information, and other information that can be used to determine computing devices to select for transmitting portions of media data streams. For example, the content management server can use the additional information to determine whether a particular computing device is suitable for transmitting a portion of a media data stream.

It should be noted that in the implementations described herein in which the client application (or other mechanisms described herein) collects information about a particular user, the user can be provided with an opportunity to control whether the client application collects information about the particular user and/or how collected user information is used by the client application. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the client application can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the client application.

Figure 2:
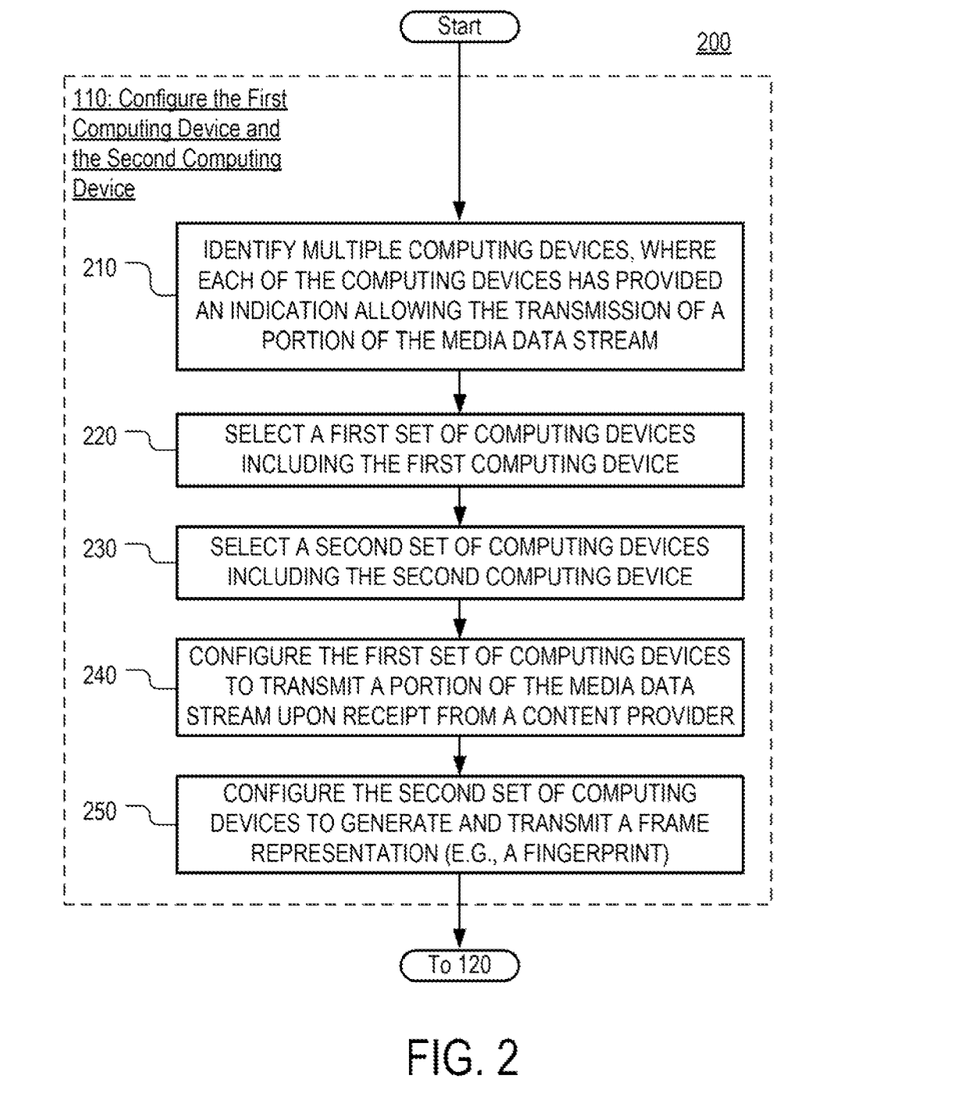
FIG. 2 shows an example of a process for configuring multiple computing devices for transmitting portions of a media data stream in accordance with some implementations of the disclosed subject matter.

This is further described in connection with FIG. 2. Turning to FIG. 2, multiple computing devices can be identified at 210. As described above, the multiple computing devices can be identified based on receiving an indication that allows transmissions of portions of the media data stream. In some implementations, this can be based on detecting that a client application has been launched on a computing device. Upon receiving an authorization from multiple computing devices, a first set of computing devices from the multiple computing devices, which can include the first computing device from 110 in FIG. 1), can be selected at 220 and a second set of computing devices from the multiple computing devices, which can include the second computing device from 110 in FIG. 1), can be selected at 230. The computing devices in the first set and the second set can be assigned using any suitable approach. For example, as described above, client device information, such as network bandwidth information, service provider information, and processing capability information, can be determined for the multiple computing devices. In this example, a computing device having network bandwidth information and processing capabilities greater than particular thresholds can be selected. In another example, a computing device having network bandwidth information and processing capabilities greater than particular thresholds can be selected for each content provider or for particular regions. In yet another example, as the transmission of a portion of a media data stream can be computationally intensive, a small number of computing devices with particular processing capability and particular network characteristics can be selected for the set of computing devices that transmits a portion of a media data stream upon receipt from a content provider and the remaining large number of computing devices can be selected to transmit smaller representations of the media data stream.

It should be noted that any suitable information can be used to assign a computing device. For example, the assignment can be based on an address of the computing device, a type of computing device (e.g., a television, a mobile telephone, a digital media player, a laptop computer, a tablet computer, a set-top box, a gaming device, etc.), a characteristic of hardware that is part of the computing device (e.g., a type of processor, an amount of available memory, etc.), an identifier associated with the computing device (e.g., a model number, a serial number, etc.), a characteristic of software associated with the computing device (e.g., a type of operating system, a type of media playback application, etc.), a location of the computing device (e.g., a geographic area or a network location), and/or any other suitable characteristic.

Upon grouping the multiple computing devices, the first set of computing devices can be configured to transmit a portion of the media data stream upon receipt from a content provider at 240 and the second set of computing devices can be configured to transmit a representation of the media data stream at 250. For example, a configuration setting can be transmitted to each computing device in the first set of computing devices, where the setting configures the computing device to transmit a portion of the media data stream (e.g., a full sequence of frames from a media data stream) prior to the computing device processing the portion of the media data stream. Similarly, a configuration setting can be transmitted to each computing device in the second set of computing devices, where the setting configures the computing device to transmit a representation of the media data stream. The representation can be any suitable digital representation that extracts features from at least a portion of the media data stream and can be used to identify the same or similar portions of media data. For example, the representation can include a hash of an image or a video screenshot, a signature or a fingerprint derived from the image or the video screenshot, an image that has a lower resolution than the full resolution frame, etc. Alternatively, the client application can have a default setting such that, unless a configuration setting is received, the computing device executing the client application can transmit representations of the media data stream.

In some implementations, the multiple computing devices can be divided such that a predetermined portion is placed in the first set of computing devices and the remaining computing devices are placed in the second set of computing devices. For example, the content management server can determine that two percent of the multiple computing devices are selected for the first set of computing devices— e.g., two computing devices for redundancy per one hundred computing devices.

Alternatively or additionally, the content management server can receive a sequence of frames or any other suitable snippet of a media data stream (e.g., frames at one frame per second) from a content source. The content management server can then delay the transmission of the media data stream to one or more computing devices, perform the image analysis described herein, and present related content along with the media data stream.

It should be noted that, in some implementations, a database of previously analyzed media data can be used. For example, as television programming can be repeated (e.g., due to syndication) or can include pre-recorded content, a database can be constructed by subscribing to and collecting media data from various sources (e.g., channels, over-the-top content providers, etc.), analyzing image frames for objects of interest, and generating fingerprints or other representations. In another example, a database of content items related to a piece of media content (e.g., a television program, a commercial, etc.) can be used. In this example, in response to identifying a particular piece of media content based on a fingerprint or other representation, one or more of the related content items can be presented to the computing device that provided the fingerprint (or another device in communication with the computing device).

Referring back to FIG. 1, a portion of a media data stream can be received from a first computing device at 120. For example, upon authorization, the portion of the media data stream can be received in response to receiving the portion of a media data stream at the first computing device and prior to processing the portion of a media data stream at the first computing device. In another example, the portion of the media data stream can be received in response to receiving a user indication at the client application to transmit the portion of the media data stream to the content management server (e.g., pressing a button on a remote control or other user input interface).

Figure 3:
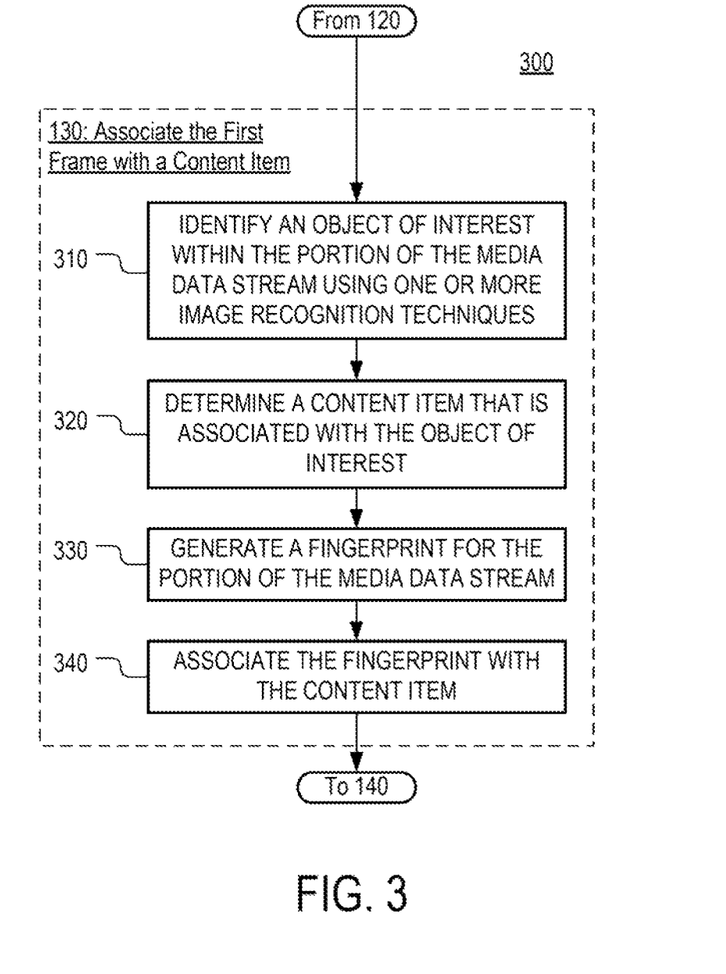
FIG. 3 shows an example of a process for associating content items with a portion of a media data stream in accordance with some implementations of the disclosed subject matter.

In some implementations, an analysis can be performed on the received portion of the media data stream at 130. More particularly, a content item can be associated with the portion of the media data stream. The content item can include an image, a video clip, an audio clip, a text portion, a piece of executable code (e.g., a script), a link (e.g., a link to a webpage), and/or any other suitable type of content. For example, as shown in FIG. 3, this can include identifying an object of interest within the portion of the media data stream using one or more image recognition techniques at 310.

For example, an object of interest can be detected within the portion of the media data stream using an object recognition technique. In a more particular example, the object recognition technique can be used to determine that a product appears at a particular time within the portion of the media data stream. In another more particular example, the object recognition technique can be used to detect any suitable object that is depicted in the portion of the media data stream, such as a landmark (e.g., the Empire State Building), an animal, an automobile, etc.

In another example, an object of interest can be a text portion that is detected using an optical character recognition technique. In a more particular example, when the media data stream includes a commercial, the optical character recognition technique can be used to identify text that is depicted in the portion of the media data stream, such as a telephone number, a product name, a business name, a polling question, etc. In another more particular example, a text portion can be obtained by using an optical character recognition technique to recognize closed captioning data that is provided as a part of the media data stream.

In yet another example, an object of interest can be a face that is detected using a facial recognition technique. In a more particular example, the facial recognition technique can analyze the portion of the media data stream to determine one or more faces within the portion of the media data stream. In some implementations, guidance information, such as program metadata or any other suitable electronic program guide information, can be used to assist in identifying the face of an actor depicted in the portion of the media data stream.

In a further example, when the portion of the media data stream includes audio data, the object of interest can include a particular portion of audio, such as an utterance of the name of a product in the portion of the media data stream, an utterance of one or more keywords in the portion of the media data stream, etc.

It should be noted that the identification of an object of interest can include an identifier that indicates the text that is displayed in the portion of the media data stream, a transcription of one or more words that are spoken in the portion of the media data stream, an identity of a product that is displayed the portion of the media data stream, an identity of a person that is shown in the portion of the media data stream, and/or any other suitable information obtained using one or more image recognition techniques.

Referring back to FIG. 3, upon identifying an object of interest, a content item that is associated with the object of interest can be determined at 320. In some implementations, this can include searching through a database that associates content items with objects of interest. For example, in response to inputting an identified object of interest (e.g., a text representation, keywords, etc.), the database can provide content items that satisfy the inputted object of interest. In some implementations, this can include extracting keywords or entities associated with the object of interest. A search query for the database can then be generated that includes one or more of these extracted keywords and, in response to the query, the database can provide results that include objects of interest that correspond to the extracted keywords.

In a more particular example, when the object of interest is a text portion that includes a question (e.g., in a game show), a search engine can be used to obtain an answer to the question. For example, the entire text portion obtained using optical character recognition can be input into a search engine of resources and search results can be provided that are responsive to the text portion. In this example, search results responsive to the inputted text portion can be analyzed to select an answer, which may include a recurring phrase or a high relevancy score.

In some implementations, as opposed to a search engine, the type of identified object can be used to determine which database or any other suitable source to access content information. For example, in instances where the object of interest is an actor (e.g., using a facial recognition technique), a movie content database can be searched to obtain an information record that is associated with the actor. The record can include a short biography of the actor and/or any other suitable information. In another example, in instances where the object of interest is a product, a product database can be searched to identify related product information (e.g., name of the manufacturer, merchants that are selling the product, detailed product information, etc.).

In some implementations, the content management application can receive user preferences from a computing device that indicates particular sources for obtaining content items. For example, the user may prefer to receive video content items from a particular content hosting service. In another example, the user may prefer to receive a link to a particular page that provides related content (e.g., the top search result when keywords describing the object of interest are input as the search query).

In some implementations, any suitable information can be used to select one of multiple content items for association with an object of interest. For example, a content item for a particular computing device can be selected based on the location information received from the computing device. In another example, a content item for a particular computing device can be selected based on historical information (e.g., search history information) received from the computing device.

In response to determining one or more associated content items, a fingerprint or any other suitable representation can be generated for the portion of the media data stream that includes the object of interest at 330 and the fingerprint can be associated with the content item at 340. The fingerprint, the content item (or an identifier for accessing the content item), and/or any other suitable information relating to the content item (e.g., placement information, image information, data stream information, etc.) can be associated and stored in a database or any other suitable storage device.

It should be noted that, although the implementations described herein generally relate to generating a video fingerprint of the received media data, this is merely illustrative. In some implementations, an audio fingerprint can be generated from the received media data. For example, the client application executing on the computing device can generate an audio fingerprint from the received media data stream using any suitable audio fingerprinting technique. The audio fingerprint can be any suitable digital representation generated from an audio portion of the media data stream, where the audio fingerprint can be used to identify the same or similar portions of audio data.

Referring back to FIG. 1, a representation of a media data stream can be received from a second computing device at 140. The representation of the media data stream can be transmitted from the second computing device in response to launching the client application on the second computing device, user selection (e.g., using a user input interface with the second computing device), or any other suitable action. For example, the representation of the media data stream can be transmitted from the second computing device in response to receiving an indication from the user that the user wishes to receive additional information on media content to be presented (e.g., an upcoming television program, a live sporting event, etc.).

At 150, the representation of the media data stream from the second computing device can be compared with the fingerprint or other suitable representations generated at 330 (FIG. 3) and stored in a database. For example, a similarity score can be determined between the representation from the second computing device and each fingerprint stored in the database. In this example, the stored fingerprint having the highest similarity score can be used to retrieve content items relating to the representation. In another example, the fingerprints can be ranked based on similarity score and fingerprints having a similarity score greater than a particular threshold value can be retained. Program metadata and other media information can then be used to filter through the retained fingerprints.

It should be noted that, in some implementations, the representation of the media data stream or fingerprint can be generated by the content management server. For example, the second computing device can transmit a portion (e.g., a small portion) of the media data stream to the content management server and, in response, the content management server can generate a representation or fingerprint of the received portion of the media data stream for comparison with the fingerprints and/or representations stored in the database.

Upon determining that a match exists between the representation from the second device and the portion of the media data stream from the first device (or any other computing device), the content item associated with the matching representation can be retrieved at 160. As described above, the content item can be additional information relating to an identified actor, product, landmark, or object, a selectable link that provides additional information about the identified object (e.g., a link that provides additional information in a web browsing application executing on the computing device), updated content relating to an identified object (e.g., a video relating to a product, a movie trailer for an identified actor, etc.), etc. The content item can be retrieved by accessing the database having entries created using, for example, process 300 of FIG. 3.

At 170, the content item can be presented to the second computing device. More particularly, the content item can be inserted into the media data stream to dynamically update media content on the second computing device.

In some implementations, presenting the content item can include transmitting the content item to the second media player over a communications network. When the content item is received by the second media player, the content item can be displayed on a display screen that is part of or coupled with the second computing device. Additionally or alternatively, in some implementations, the content item can be output via an audio output device that is part of or coupled with the second computing device. In some implementations, the second computing device can display the content item without any substantial delay following receipt of the content item. Additionally or alternatively, in some implementations, the second computing device can wait until a condition exists before displaying the content item (e.g., a portion of the media data stream for including the content item, a blank screen suitable for providing the content item, the appearance of the object of interest in a subsequent portion of the media data stream, etc.).

Figure 4:
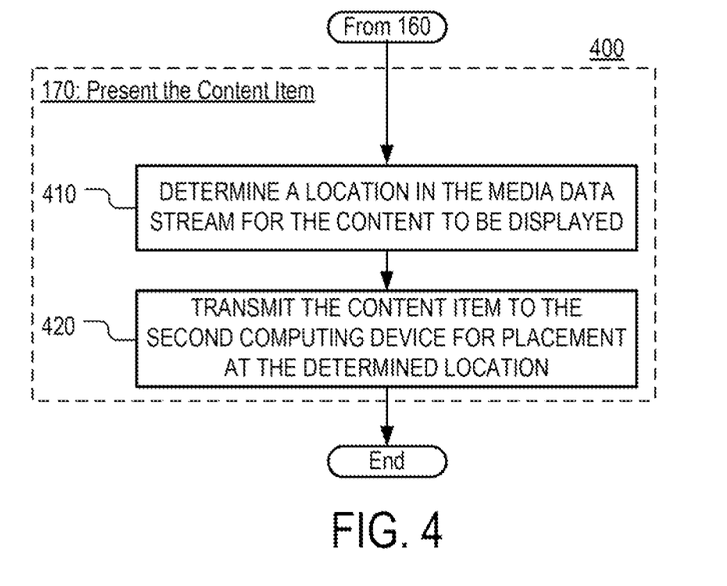
FIG. 4 shows an example of a process for presenting related content within the media data stream in accordance with some implementations of the disclosed subject matter.

In some implementations, the content item can be presented using any suitable approach. For example, as shown in FIG. 4, a location for presenting the content item is determined at 410 and the parameters for displaying the content item can be transmitted along with the content item at 420. In a more particular example, the content item can be presented at a predetermined location within a portion of the media data stream (e.g., in an overlay window on the bottom-left corner of a display screen, based on the location of the object of interest, etc.). In another more particular example, the content item can be presented at a particular segment of the media data stream, such as in the media data stream when the closing credits of a television program are presented, when a portion of the media data stream is blank or not providing programming, etc. In yet another more particular example, the content item can be presented in response to receiving a suitable indication from other devices in communication with the computing device, such as a camera device that indicates that the user is watching the display device presenting the media content.

In some implementations, only particular content items can be presented to the user of the computing device. For example, in response to detecting particular user preferences (e.g., for updated content or additional information), the computing device can determine whether the content item meets particular criteria. In a more particular example, in response to receiving an indication from the user to receive updated text portions in commercials, only those content items that can be placed in detected text portions can be presented to the user. In this example, while viewing a commercial, the user can be presented with updated phone numbers retrieved for a merchant, a website address associated with a product, etc.

It should be noted that any suitable parameters for presenting and/or incorporating the content item can be transmitted along with the content item. For example, the parameters can include one or more criterion that must be met prior to presenting the content item. In a more particular example, the computing device can detect whether a subsequent portion of the media data stream includes the object of interest (e.g., using any suitable image recognition technique), whether a subsequent portion of the media data stream includes particular audio data (e.g., an audio clip played at the closing of a program), whether a subsequent portion of the media data stream is substantially blank, etc. In another example, the parameters can include instructions for presenting the content, such as presenting the content item to replace or be superimposed over an object of interest within a portion of the media data stream (e.g., replace a telephone number with an updated telephone number), to be placed in a particular location that does not obstruct other objects in the portion of the media data stream, etc. Any suitable parameter related to the presentation of the content item by the second media player can be transmitted with (or in a separate communication from) the content item. For example, the parameter can indicate: a location on a display screen where the content item is to be displayed, a time when the content item is to be displayed, a type of segment of the media stream in which the content item is to be presented (e.g., a segment that includes closing credits, a segment that includes blacked out frames, etc.), a condition that has to be satisfied before the content item is presented, a time period for which the content item is to be presented, and/or any other suitable parameter. The parameter can include a number, a string, an alphanumerical string and/or any other suitable type of identifier.

Figure 5:
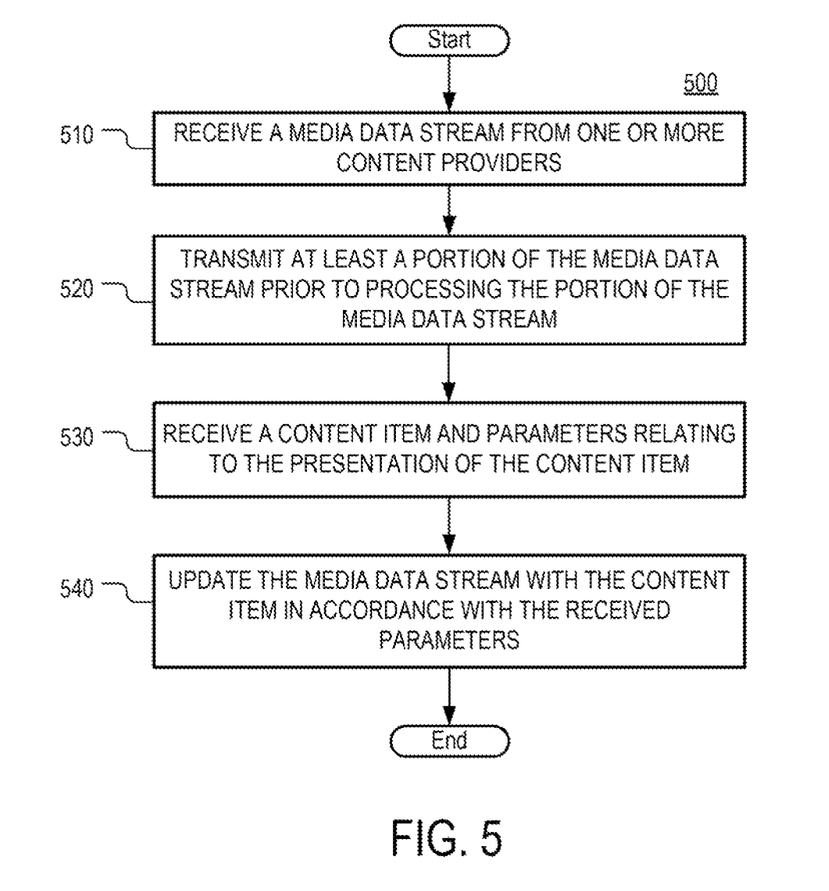
FIG. 5 shows an example of a process for transmitting a portion of a media data stream and updating the portion of the media data stream with a content item in accordance with some implementations of the disclosed subject matter.

Turning to FIG. 5, FIG. 5 shows an example of a process 500 for transmitting a portion of a media data stream and updating the media data stream with a content item in accordance with some implementations of the disclosed subject matter. At 510, a computing device can receive a portion of a media data stream from one or more content providers. This can include, for example, live television program. Prior to processing or otherwise presenting the media content from the portion of the media data stream, the computing device can transmit at least a portion of the media data stream to the content management server at 520. As described above, prior to transmitting at least a portion of the media data stream to the content management server, the computing device can receive a user authorization to transmit such media data.

In some implementations, the computing device can provide the user with an opportunity to set additional parameters relating to media content insertion and/or replacement. For example, the user can provide a setting relating to the frequency for transmitting a portion of the media data stream to the content management server. In another example, the user can provide a setting relating to the type of content for content insertion and/or replacement (e.g., text portions in commercials, additional information relating to particular entities in television programming, etc.). In yet another example, the user can provide a setting relating to the sources that content items can be obtained (e.g., particular search engines, particular databases, particular content hosting services, etc.).

In response to transmitting at least a portion of the media data stream (e.g., a sequence of frames, a fingerprint or any other suitable representation, etc.), the computing device can receive a content item and parameters relating to the presentation of the content item at 530. In response, the computing device can update the media data stream with the content item in accordance with the received parameters at 540. For example, a content item can be inserted in the media data stream to superimpose a particular region within the media data stream. In a more particular example, a region containing additional information relating to an actor can be presented upon detecting the actor or any other suitable object of interest in a portion of the media data stream (e.g., in a subsequent portion of the media data stream where the object of interest appears again, in the portion of the media data stream analyzed at 310 of FIG. 3 when the portion of the media data stream has not yet been processed by the computing device, etc.).

It should be noted that the parameters relating to the presentation and/or placement of a content can be set by any suitable entity. For example, an advertiser can provide an updated phone number for association with the advertiser's commercials and, in response to identifying an object of interest (e.g., an image of the advertiser's product, a text portion that includes the advertiser's phone number, etc.), the content items that are associated with the object of interest and/or the commercial can be retrieved. In this example, the updated phone number provided by the advertiser can be superimposed over the identified text portion of the outdated telephone number within the media data stream.

Figure 6:
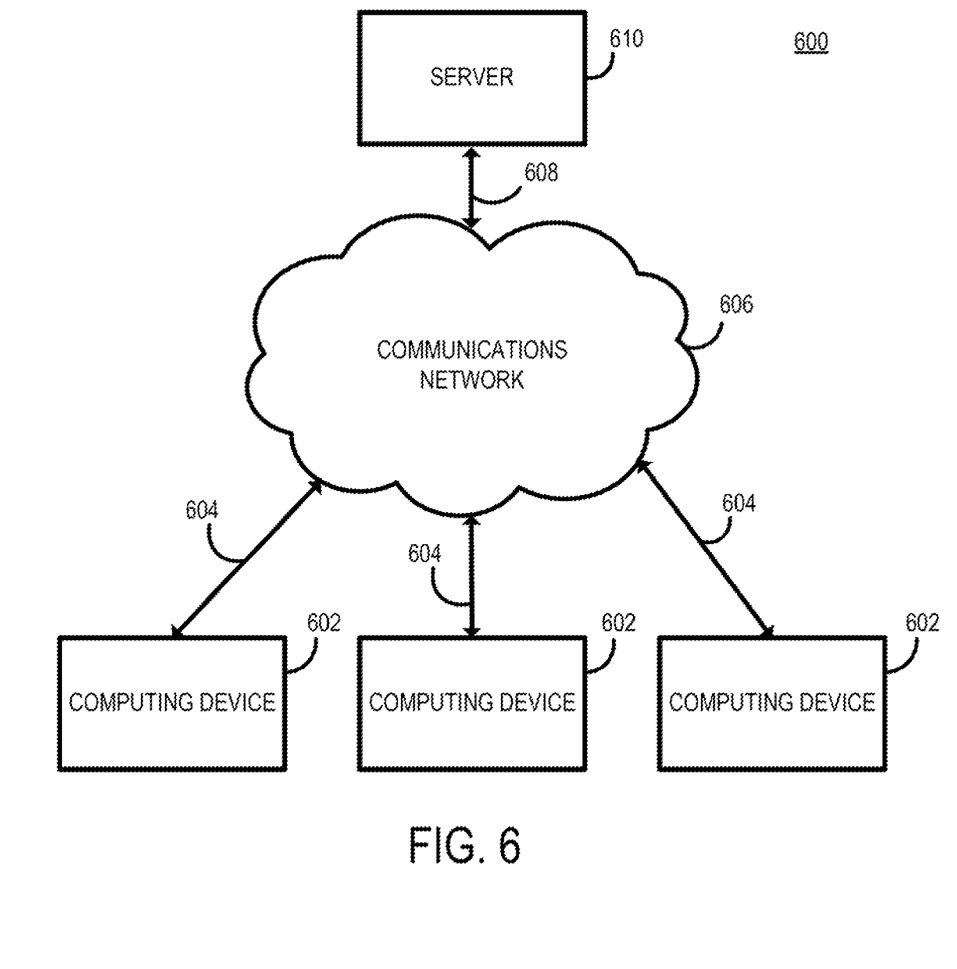
FIG. 6 shows a schematic diagram of an illustrative system suitable for implementation of the mechanisms described herein for media transmission and management in accordance with some implementations of the disclosed subject matter.

FIG. 6 shows an example 600 of a generalized schematic diagram of a system on which the mechanisms for media transmission and management as described herein can be implemented in accordance with some implementations of the disclosed subject matter. As illustrated, system 600 can include one or more computing devices 602. Computing devices 602 can be connected by one or more communication links 604 to a communications network 606 that can be linked via a communications link 608 to a server 610. In some implementations, computing devices 602 and server 610 can be linked via a communications link to one or more content sources.

System 600 can include one or more servers 610. Server 610 can be any suitable server for providing access to the mechanisms described herein for media transmission and management, such as a processor, a computer, a data processing device, or any suitable combination of such devices. For example, the mechanisms for media transmission and management can be distributed into multiple backend components and multiple frontend components and/or interfaces. In a more particular example, backend components, such as data collection and data distribution, can be performed on one or more servers 610.

In some implementations, each of the computing devices 602 and server 610 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 602 can be implemented as a smartphone, a tablet computer, a wearable computer, a smart television, a set-top box, a digital media receiver, a game console, a personal computer, a laptop computer, a personal digital assistant (PDA), a home entertainment system, any other suitable computing device, or any suitable combination thereof.

In some implementations, a content source can be any suitable content source, such as a cable (or telephone) television content source, a satellite television content source, an on-demand program content source, an over-the-top program content source, an Internet content source, a streaming program content source, any other suitable content source, or any suitable combination thereof.

In some implementations, communications network 606 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 604 and 608 can be any communications links suitable for communicating data among computing devices 602, server 610, and content sources, such as network links, dial-up links, wireless links, hard-wired links, any other suitable communications links, or any suitable combination of such links. Computing devices 602 can enable use of the techniques described herein that can allow the features of the mechanisms to be used. Computing devices 602, server 610, and content sources can be located at any suitable location.

Figure 7:
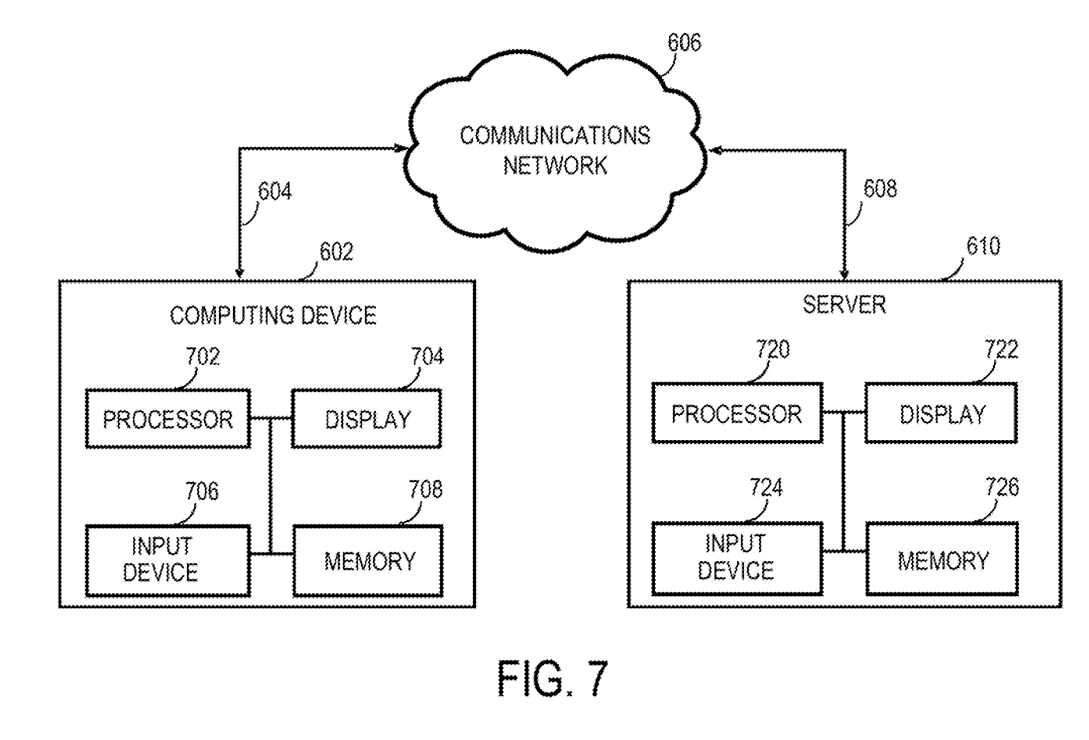
FIG. 7 shows a detailed example of a server and one of the computing devices of FIG. 6 that can be used in accordance with some implementations of the disclosed subject matter.

FIG. 7 illustrates an example 700 of hardware that can be used to implement server 610 and one of computing devices 602 depicted in FIG. 6 in accordance with some implementations of the disclosed subject matter. Referring to FIG. 7, computing device 602 can include a hardware processor 702, a display 704, an input device 706, and memory 708, which can be interconnected. In some implementations, memory 708 can include a storage device (such as a non-transitive computer-readable medium) for storing a computer program for controlling hardware processor 702.

Hardware processor 702 can use the computer program to present on display 704 content and/or an interface that allows a user to interact with the client application and to send and receive data through communications link 602. It should also be noted that data received through communications link 602 or any other communications links can be received from any suitable source. In some implementations, hardware processor 702 can send and receive data through communications link 602 or any other communication links using, for example, a transmitter, receiver, transmitter/receiver, transceiver, or any other suitable communication device. Input device 706 can be a computer keyboard, a mouse, a trackball, a keypad, a remote control, any other suitable input device, or any suitable combination thereof. Additionally or alternatively, input device 706 can include a touch screen display 704 that can receive input (e.g., using a finger, a stylus, or the like).

Server 610 can include a hardware processor 720, a display 722, an input device 724, and memory 726, which can be interconnected. In some implementations, memory 726 can include a storage device for storing data received through communications link 608 or through other links. The storage device can further include a server program for controlling hardware processor 720.

The mechanisms described herein for presenting content items can be implemented in computing devices 602 and/or server 610 as software, firmware, hardware, or any suitable combination thereof.

In some implementations, server 610 can be implemented in one server or can be distributed as any suitable number of servers. For example, multiple servers 610 can be implemented in various locations to increase reliability and/or increase the speed at which the server can communicate with client devices 602. As another example, multiple servers 610 can be implemented for performing various tasks, such as one server (or set of servers) can receive portion of the media data stream (e.g., a sequence of frames from a live media data stream, fingerprints, representations of the media data stream, etc.), another server (or set of servers) can execute the content insertion application for determining whether the portion of the media data stream includes an object of interest, and yet another server can obtain content items relating to the object of interest and present the content item to viewers.

In some implementations, the client application can include an application program interface (not shown), and/or can be resident in memory 708 of computing device 702 and/or memory 726 of server 610. Additionally or alternatively, a graphical user interface ("GUI") can be distributed to computing device 602, which can allow a user to interact with the client application resident at, for example, server 610.

In some implementations, the application can include client-side software, server-side software, hardware, firmware, or any suitable combination thereof. For example, the application can encompass a computer program that causes one or more processors to execute the content generation application. As another example, the application(s) can encompass a computer program written in a programming language recognizable by computing device 602 and/or server 610 that is executing the application(s) (e.g., a program written in a programming language, such as, Java, C, Objective-C, C++, C#, Javascript, Visual Basic, HTML, XML, ColdFusion, any other suitable approaches, or any suitable combination thereof).

In some implementations, the application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for media transmission and management are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-5 can be executed or performed in any order or sequence not limited to the order and sequence shown and described in the figures. Also, some of the above steps of the processes of FIGS. 1-5 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for media content management, the system comprising:
   a hardware processor coupled with memory containing computer executable instructions that, when executed by the hardware processor, is configured to:
   identify a plurality of computing devices associated with a content provider, wherein each of the plurality of computing devices has provided an indication allowing the transmission of sequences of one or more media data streams;
   divide the plurality of computing devices associated with a content provider based on device information that includes network bandwidth information of each of the plurality of computing devices or processing capability of each of the plurality of computing devices by assigning a first set of the plurality of computing devices to transmit full sequences of frames corresponding to a media data stream and assigning a second set of the plurality of computing devices to transmit fingerprints of the media data stream, wherein the first set of the plurality of computing devices includes a first computing device and the second set of the plurality of computing devices includes a second computing device;
   receive a sequence of the media data stream from the first computing device prior to the first computing device processing the sequence of the media data stream for presentation on the first computing device and in response to receiving an authorization from the first computing device to process media data streams for related content items;
   process the sequence of the media data stream received from the first computing device, wherein the processing includes identifying an object of interest within the media data stream received from the first computing device;
   determine an entity associated with the object of interest identified within the media data stream received from the first computing device; associate a content item with the object of interest based on the determined entity;
   generate a first video fingerprint of the sequence of the media data stream, wherein the first video fingerprint is associated with the content item and placement information associated with the content item and wherein the content item and the placement information associated with the content item are transmitted in connection with the sequence of the media data stream for rendering on the first computing device;

receive a second video fingerprint of the media data stream from the second computing device;

determine whether the second computing device has been assigned to the second set of the plurality of computing devices; compare the second video fingerprint with the first video fingerprint in response to determining that the second computing device was assigned to the second set of the plurality of computing devices and in response to receiving the second video fingerprint of the media data stream; and transmit the content item and the placement information associated with the content item associated to the second computing device for placement within the media data stream in response to the comparison indicating that the second video fingerprint matches the first video fingerprint.

2. The system of claim 1, wherein the processor is further configured to transmit an instruction to delay the processing of the media data stream on the first computing device.

3. The system of claim 1, wherein the hardware processor is further configured to receive the indication from each of the plurality of computing devices to allow portions of the media data stream to be transmitted prior to processing the portions of the media data stream.

4. The system of claim 1, wherein the hardware processor is further configured to:
detect a face within the sequence of the media data stream using a facial recognition technique; and
determine the entity associated with the detected face.

5. The system of claim 1, wherein the hardware processor is further configured to:
identify a text portion within the sequence of the media data stream using an optical character recognition technique;
determine whether the identified text portion meets one or more criterion;
determine the content item associated with the identified text portion in response to the text portion meeting the one or more criterion; and
transmit the content item to the second computing device, wherein the content item causes the second computing device to navigate to a destination corresponding to the identified text portion.

6. The system of claim 1, wherein the hardware processor is further configured to:
extract the object of interest from the sequence of the media data stream using an object recognition technique; and
identify a product associated with the object of interest, wherein the content item includes information relating to the identified product.

7. The system of claim 1, wherein the hardware processor is further configured to:
extract an audio sample from the sequence of the media data stream;
identify a keyword in the audio sample using an audio recognition technique; and
determine a product associated with the identified keyword, wherein the content item includes information relating to the determined product.

8. The system of claim 1, wherein the first video fingerprint and the second video fingerprint include a smaller amount of media data than the received sequence of the media data stream.

9. A method for media content management, the method comprising:

identifying, using a hardware processor, a plurality of computing devices associated with a content provider, wherein each of the plurality of computing devices has provided an indication allowing the transmission of sequences of one or more media data streams;

dividing, using the hardware processor, the plurality of computing devices associated with a content provider based on device information that includes network bandwidth information of each of the plurality of computing devices or processing capability of each of the plurality of computing devices by assigning a first set of the plurality of computing devices to transmit full sequences of frames corresponding to a media data stream and assigning a second set of the plurality of computing devices to transmit fingerprints of the media data stream, wherein the first set of the plurality of computing devices includes a first computing device and the second set of the plurality of computing devices includes a second computing device;

receiving, using the hardware processor, a sequence of the media data stream from the first computing device prior to the first computing device processing the sequence of the media data stream for presentation on the first computing device and in response to receiving an authorization from the first computing device to process media data streams for related content items;

processing, using the hardware processor, the sequence of the media data stream received from the first computing device, wherein the processing includes identifying an object of interest within the media data stream received from the first computing device;

determining, using the hardware processor, an entity associated with the object of interest identified within the media data stream received from the first computing device;

associating, using the hardware processor, a content item with the object of interest based on the determined entity;

generating, using the hardware processor, a first video fingerprint of the sequence of the media data stream, wherein the first video fingerprint is associated with the content item and placement information associated with the content item and wherein the content item and the placement information associated with the content item are transmitted in connection with the sequence of the media data stream for rendering on the first computing device;

receiving, using the hardware processor, a second video fingerprint of the media data stream from the second computing device;

determining, using the hardware processor, whether the second computing device has been assigned to the second set of the plurality of computing devices;

comparing, using the hardware processor, the second video fingerprint with the first video fingerprint in response to determining that the second computing device was assigned to the second set of the plurality of computing devices and in response to receiving the second video fingerprint of the media data stream; and transmitting, using the hardware processor, the content item and the placement information associated with the content item associated to the second computing device for placement within the media data stream in response to the comparison indicating that the second video fingerprint matches the first video fingerprint.

10. The method of claim 9, further comprising transmitting an instruction to delay the processing of the media data stream on the first computing device.

11. The method of claim 9, further comprising receiving the indication from each of the plurality of computing devices to allow portions of the media data stream to be transmitted prior to processing the portions of the media data stream.

12. The method of claim 9, further comprising:
detecting a face within the of the media data stream using a facial recognition technique; and
determining the entity associated with the detected face.

13. The method of claim 9, further comprising:
identifying a text portion within the sequence of the media data stream using an optical character recognition technique;
determining whether the identified text portion meets one or more criterion;
determining the content item associated with the identified text portion in response to the text portion meeting the one or more criterion; and
transmitting the content item to the second computing device, wherein the content item causes the second computing device to navigate to a destination corresponding to the identified text portion.

14. The method of claim 9, further comprising:
extracting the object of interest from the sequence of the media data stream using an object recognition technique; and
identifying a product associated with the object of interest, wherein the content item includes information relating to the identified product.

15. The method of claim 9, further comprising:
extracting an audio sample from the sequence of the media data stream;
identifying a keyword in the audio sample using an audio recognition technique; and
determining a product associated with the identified keyword, wherein the content item includes information relating to the determined product.

16. The method of claim 9, wherein the first video fingerprint and the second video fingerprint include a smaller amount of media data than the received sequence of the media data stream.

17. A non-transitory computer-readable medium containing computer executable instructions that, when executed by a processor, cause the processor to perform a method for media content management, the method comprising:
identifying a plurality of computing devices associated with a content provider, wherein each of the plurality of computing devices has provided an indication allowing the transmission of sequences of one or more media data streams;
dividing the plurality of computing devices associated with a content provider based on device information that includes network bandwidth information of each of the plurality of computing devices or processing capability of each of the plurality of computing devices by assigning a first set of the plurality of computing devices to transmit full sequences of frames corresponding to a media data stream and assigning a second set of the plurality of computing devices to transmit fingerprints of the media data stream, wherein the first set of the plurality of computing devices includes a first computing device and the second set of the plurality of computing devices includes a second computing device;
receiving a sequence of the media data stream from the first computing device prior to the first computing device processing the sequence of the media data stream for presentation on the first computing device and in response to receiving an authorization from the first computing device to process media data streams for related content items;
processing the sequence of the media data stream received from the first computing device, wherein the processing includes identifying an object of interest within the media data stream received from the first computing device;
determining an entity associated with the object of interest identified within the media data stream received from the first computing device;
associating a content item with the object of interest based on the determined entity;
generating a first video fingerprint of the sequence of the media data stream, wherein the first video fingerprint is associated with the content item and placement information associated with the content item and wherein the content item and the placement information associated with the content item are transmitted in connection with the sequence of the media data stream for rendering on the first computing device;
receiving a second video fingerprint of the media data stream from the second computing device;
determining whether the second computing device has been assigned to the second set of the plurality of computing devices;
comparing the second video fingerprint with the first video fingerprint in response to determining that the second computing device was assigned to the second set of the plurality of computing devices and in response to receiving the second video fingerprint of the media data stream; and
transmitting the content item and the placement information associated with the content item associated to the second computing device for placement within the media data stream in response to the comparison indicating that the second video fingerprint matches the first video fingerprint.

18. The non-transitory computer-readable medium of claim 17, wherein the method further comprises transmitting an instruction to delay the processing of the media data stream on the first computing device.

19. The non-transitory computer-readable medium of claim 17, wherein the method further comprises receiving the indication from each of the plurality of computing devices to allow portions of the media data stream to be transmitted prior to processing the portions of the media data stream.

20. The non-transitory computer-readable medium of claim 17, wherein the method further comprises:
detecting a face within the sequence of the media data stream using a facial recognition technique; and
determining the entity associated with the detected face.

21. The non-transitory computer-readable medium of claim 17, wherein the method further comprises:
identifying a text portion within the sequence of the media data stream using an optical character recognition technique; and
determining whether the identified text portion meets one or more criterion;
determining the content item associated with the identified text portion in response to the text portion meeting the one or more criterion; and transmitting the content item to the second computing device, wherein the content item causes the second computing device to navigate to a destination corresponding to the identified text portion.

22. The non-transitory computer-readable medium of claim 17, wherein the method further comprises:
extracting the object of interest from the sequence of the media data stream using an object recognition technique; and
identifying a product associated with the object of interest, wherein the content item includes information relating to the identified product.

23. The non-transitory computer-readable medium of claim 17, wherein the method further comprises:
extracting an audio sample from the sequence of the media data stream;
identifying a keyword in the audio sample using an audio recognition technique; and
determining a product associated with the identified keyword, wherein the content item includes information relating to the determined product.

24. The non-transitory computer-readable medium of claim 17, wherein the first video fingerprint and the second video fingerprint include a smaller amount of media data than the received sequence of the media data stream.

\* \* \* \* \*